United States Patent Office 3,813,356
Patented May 28, 1974

3,813,356
FIRE-RETARDANT MATERIAL OR CONGLOMERATE CONTAINING FILLER CONSISTING ESSENTIALLY OF MAGNESIUM SILICATE
Henri Lievremont, 103 Rue Lamarck, and Adolphe Cominassi, 95 Avenue Mozart, both of 75 Paris, France
No Drawing. Filed Aug. 22, 1972, Ser. No. 282,757
Claims priority, application France, July 18, 1972, 25,814
Int. Cl. C08f 47/10, 51/18
U.S. Cl. 260—2.5 F    19 Claims

ABSTRACT OF THE DISCLOSURE

This invention concerns a new industrial product consisting of a fire-retardant material or conglomerate, characterized by the fact that it contains 25 to 80% of a binder consisting of a phenol-formol resin, and 30 to 120% fillers, preferably inorganic fillers, in relation to the weight of resin, including 10 to 42% magnesium silicate powder.

This material meets building safety standards, notably for high-rise buildings.

---

This invention concerns a new industrial product consisting of a fire-material or conglomerate, and the process for obtaining this material.

Such a material is extremely useful, since it meets building safety standards, particularly for high-rise buildings. It can be used alone, in the form of panels, or combined with other substances, preferably as one layer of a multilayer material.

The invention proposes a fire-retardant material, obtainable by different methods and with widely varying equipment, provided that it allows the supply and circulation of products with very different viscosities.

The invention concerns a material or conglomerate containing 25 to 80% of a binder consisting of a phenol-formol resin, and between 30 and 20% fillers in relation to the weight of resin. These fillers are preferably inorganic, and include 10 to 42% magnesium silicate powder. According to one feature of the invention, the fillers include 10 to 35% magnesium silicate powder in relation to the weight of resin, and up to 50% of a mixture of mica and asbestos powder, the mica preferably consisting of powdered or granulated split mica (sold commercially under the name of Perlite).

According to another feature of the invention, the fillers include 2 to 8% finely granulated lead.

According to another feature of the invention, the fillers also include one or more powdered substances such as calcium carbonate, $TiO_2$, silica, slate, wood dust or cork dust, and one or more substances, preferably acicular, such as glass fibre or polyamide-based synthetic fibres, organic resins, etc.

The term "powder" is generally applied to substances for which the grading is such as to leave no residue when passed over a screen with 300 holes per sq. cm.

This invention concerns a process for obtaining a material or conglomerate as described above, in which one or more of the fillers are mixed in a phenol-formol resin, at a temperature of between 20 or 80° C., and preferably between 40 and 50° C., and then, while the resin is being stirred vigorously, 12 to 15% acid polycondensation agent, and 0.5 to 3.5%, and preferably 1 to 2.5%, expansion agent, in relation to the weight of resin, are added, and the mixture thus obtained is extruded almost immediately, with the temperature kept below 180° C.

If a small amount of acid is used (less than 12% weight), the density is lower and expansion therefore greater; if a large amount is used (more than 15%), density is greater and expansion more difficult.

Extrusion should be performed less than 120 seconds and preferably less than 90 seconds after the polycondensation and expansion agents have been added.

The viscosity of the phenol-formol resin should be around 400 to 750 cps., and preferably 500 to 650 cps., at 40° C. and atmospheric pressure.

According to one feature of the process, the acid polycondensation agent is an acid belonging to the group comprising HCl, $H_2SO_4$, $H_3PO_4$, and benzene sulphonic acid, preferably dissolved in a solvent of the resin.

The expansion agent preferably consists of $NaHCO_3$, porophores and similar substances.

According to one feature of the invention, vigorous stirring takes place in a mixer equipped with an agitator operating at a speed of between 1,500 and 750 r.p.m.

The speed of extrusion is preferably 1 to 3 times, and preferably 1.5 to 2 times, the volume of the mixer per minute.

Other aims and advantages of the invention are illustrated in the following examples, although the invention is in no way confined to these examples.

Unless otherwise stated, quantities are expressed in parts weight or percentage weight in relation to the parts weight or weight of phenol-formol resin.

The materials obtained have different properties, depending on the quantities and type of fillers used.

For instance, the K-value (heat conductivity) is low, and good soundproofing is obtained, if asbestos, mica, silica and slate are excluded from the mixture.

Finely granulated lead improves sound insulation.

EXAMPLE 1

The following substances were mixed in an external or internal mixer equipped with a cooling system and exhaust system, to remove most of the occluded gas, until a homogenized mixture was obtained, the temperature being kept at 45° C.:

|  | Parts weight |
|---|---|
| Phenol-formol resin | 100 |
| Magnesium silicate powder (ordinary talc) | 15 |
| Wood dust | 22 |
| Finely granulated lead | 5 |
| Granulated split mica ("Perlite") | 2.2 |

13.5% $SO_4H_2$ was then added at 45° C., dissolved in double the volume of a solvent of the resin, consisting of methanol. 2% $CO_3HNa$ was simultaneously added.

The use of the solvent caused local dilution of the resin, facilitating incorporation of $SO_4H_2$ into the cosoluble resin, and the $CH_3OH$ was then vaporized, because of the exothermic nature of the reaction. Mixing was done in a 25 liter mixer equipped with an agitator operating at a speed of between 1,500 r.p.m. at the beginning and 750 r.p.m.

The heat discharged in the mixer was checked, and the temperature kept below 180° C. by an external cooling-water system.

The material was then extruded. The time elapsing between the adding of the $SO_4H_2$ and $CO_3HNa$ and actual extrusion did not exceed 90 seconds. The rate of extrusion was approximately 40 kg. per minute.

The material set within 3 minutes of extrusion.

The physical properties of the material were measured, 24 hours after extrusion, with the following results:

compressive strength: 6 kg./sq. cm.
bending strength (Young method): 300 kg./sq. cm.
excellent sound insulation
K less than 1 for a thickness of 20 mm. at 20° C.
ignition extremely difficult.

This material offers low heat conductivity and good soundproofing qualities.

EXAMPLE 2

The same method was applied as in example 1, using the following ingredients:

| | Parts weight |
|---|---|
| Phenol-formol resin | 100 |
| Magnesium silicate powder | 25 |
| Granulated split mica | 9 |
| Magnesium carbonate powder | 20 |
| $TiO_2$ powder | 4 |
| Finely granulated lead | 3 |
| Powdered asbestos | 20 |
| Powdered slate | 5 |
| Powdered mica | 20 |
| Powdered silica | 5 |

Extrusion was done as in example 1, after the addition of 13.5% $SO_4H_2$ and 1.5% $CO_3HNa$.

The resulting material had the following physical properties:

sound insulation: average
fire-retardant level: very high
K less than 1 for a thickness of 30 mm. at 20° C.
compressive strength: 15 kg./sq. cm.
bending strength: 450 kg./sq. cm.

EXAMPLE 3

The same method was applied as in example 1, using the following ingredients:

| | Parts weight |
|---|---|
| Phenol-resin formol | 100 |
| Magnesium silicate powder | 15 |
| Granulated split mica | 3 |
| Powdered asbestos | 10 |
| Powdered mica | 2.5 |
| $TiO_2$ powder | 3 |

3.5% $SO_4H_2$ and 2% $CO_3HNa$ were added, before extrusion.

The resulting material had the following physical properties:

compressive strength: 8 kg./sq. cm.
bending strength: 400 kg./sq. cm.
K less than 1 for a thickness of 40 mm. at 20° C.

This material is suitable for the construction of partitions.

EXAMPLE 4

The same method was applied as in example 1, using phenol-formol resin alone, and adding the same percentages of $CO_3HNa$ and $SO_4H_2$ before extrusion.

The material obtained was not particularly flammable, but disintegrated when subjected to the same temperature as the materials from examples 1 to 3 had withstood without deterioration, namely 3,000° C.

Naturally, the invention is not confined to the embodiments described here: many alternative versions are possible, for someone skilled in the art, without departing from the spirit of the invention.

What is claimed is:

1. A filled resinous material comprising 25–80% by weight of a phenolic polycondensate resin binder, which binds together 30–120% by weight, based on the weight of the resin binder, of a particulate filler component consisting essentially of magnesium silicate blended with at least one other particulate organic or inorganic filler, the amount of said magnesium silicate being 10–42% by weight, based on the weight of said resin binder.

2. Material according to claim 1, wherein said filler component consists essentially of 10–35% by weight of magnesium silicate, based on the weight of the resin binder, and up to 50% by weight of a mixture of mica and asbestos powder, based on the weight of the resin binder.

3. Material according to claim 2, wherein the mica consists essentially of granulated split mica.

4. Material according to claim 1, wherein said filler component further contains 2 to 8% by weight finely granulated lead, based on the weight of the resin binder.

5. Material according to claim 1, wherein the filler component further comprises (a) at least one powdered substance, which leaves essentially no residue when passed over a screen having 300 holes per square centimeter, and (b) at least one acicular substance.

6. Material according to claim 5, wherein said powdered substance is selected from the group consisting of calcium carbonate, titanium dioxide, silica, slate, wood dust, and cork dust, and wherein said acicular substance is selected from the group consisting of glass fiber and polyamide-based synthetic fiber.

7. A process for obtaining a material or conglomerate as defined in claim 1, in which at least one of the fillers is mixed in a phenol-formol resin, at a temperature of between 20 or 80° C., and then, while the resin is being stirred vigorously, 12 to 15% acid polycondensation agent, and 0.5 to 3.5% expansion agent, in relation to the weight of resin, are added simultaneously, and the mixture thus obtained is extruded almost immediately, with the temperature kept below 180° C.

8. A process as defined in claim 7, in which 1 to 2.5% expansion agent is added.

9. A process as defined in claim 7, in which extrusion is performed less than 120 seconds after the polycondensation and expansion agents have been added.

10. A process as defined in claim 9, in which extrusion is performed less than 90 seconds after the polycondensation and expansion agents have been added.

11. A process as defined in claim 7, in which the acid polycondensation agent is an acid belonging to the group comprising HCl, $H_2SO_4$, $H_3PO_4$ and benzene sulphonic acid.

12. A process as defined in claim 11, in which the acid polycondensation agent is dissolved in a solvent for the resin.

13. A process as defined in claim 7, in which the expansion agent is $NaHCO_3$.

14. A process as defined in claim 7, in which said fillers, said resin, said polycondensation agent, and said expansion agent are mixed with vigorous stirring in a mixer equipped with an agitator operating at a speed of between 1,500 and 750 r.p.m.

15. A process as defined in claim 7, in which the speed of extrusion is 1 to 3 times the volume of the mixer per minute.

16. A process as defined in claim 15, in which the speed of extrusion is 1½ times to twice the volume of the mixer per minute.

17. A process as defined in claim 1, in which the quantities of fillers, expressed as parts weight in relation to 100 parts phenol-formol resin, are 12 to 20 parts magnesium silicate powder, 20 to 25 parts wood dust, 3 to 6 parts finely granulated lead and 1.5 to 3 parts granulated split mica.

18. A process as defined in claim 1, in which the quantities of fillers, expressed as parts weight in relation to 100 parts phenol-formol resin, are 18 to 30 parts magnesium silicate, 15 to 25 parts magnesium carbonate, 15 to 25 parts asbestos, 14 to 25 parts mica, 2 to 6% $TiO_2$, 3 to 7 parts slate and 3 to 8 parts silica, all in powder form, 7 to 10% granulated split mica and 1 to 4 parts finely granulated lead.

19. A process as defined in claim 1, in which the quantities of fillers, expressed as parts weight in relation to 100 parts phenol-formol resin, are 10 to 20 parts magnesium silicate, 6 to 15 parts asbestos, 1 to 5 parts mica and 2 to 5 parts $TiO_2$, all in powder form, and 2 to 4 parts granulated split mica.

References Cited
UNITED STATES PATENTS

| 3,660,121 | 5/1972 | McCarthy | 260—38 |
| 3,567,807 | 3/1971 | Shannon | 260—2.5 F |

WILLIAM H. SHORT, Primary Examiner

E. WOODBERRY, Assistant Examiner

U.S. Cl. X.R.

260—2.5 E, FP, 17.2 38

UNITED STATES PATENT OFFICE
CERTIFICATE OF CORRECTION

Patent No. 3,813,356         Dated May 28, 1974

Inventor(s)  Henri Lievremont and Adolphe Cominassi

It is certified that error appears in the above-identified patent and that said Letters Patent are hereby corrected as shown below:

In column 1, line 38, for "20%" read --120%--.

In column 2, line 18, for "porophores" read --"Porophores"--.

In column 5, line 1, for "25 parts mica" read --24 parts mica--.

Signed and sealed this 1st day of October 1974.

(SEAL)
Attest:

McCOY M. GIBSON JR.
Attesting Officer

C. MARSHALL DANN
Commissioner of Patents